United States Patent [19]

Funahashi

[11] Patent Number: 5,361,116
[45] Date of Patent: Nov. 1, 1994

[54] CAMERA HAVING DEVICE FOR WRITING INFORMATION ONTO FILM

[75] Inventor: Akira Funahashi, Sakai, Japan

[73] Assignee: Minolta Camera Kabushiki Kaisha, Osaka, Japan

[21] Appl. No.: 51,368

[22] Filed: Apr. 23, 1993

[30] Foreign Application Priority Data

Apr. 27, 1992 [JP]  Japan .................. 4-136162

[51] Int. Cl.$^5$ .................. G03B 13/36; G03B 15/03; G03B 17/24; G03B 17/38
[52] U.S. Cl. .................. 354/403; 354/476; 354/106; 354/149.11; 354/266; 354/288
[58] Field of Search .............. 354/105, 106, 288, 403, 354/149.11, 476, 266, 295

[56] References Cited

U.S. PATENT DOCUMENTS 4,878,075 10/1989 Cannon .................. 354/106
4,996,546  2/1991 Pagano et al. ............ 354/105

FOREIGN PATENT DOCUMENTS 4-68333 3/1992 Japan .

Primary Examiner—W. B. Perkey
Attorney, Agent, or Firm—Burns, Doane, Swecker & Mathis

[57] ABSTRACT

In a camera having a head for writing information onto a film or reading information written previously, the head is positioned beside an exposure aperture so as to contact the back surface of the film. At least one of a viewfinder mechanism, a light detecting section of a light measuring device and an auto-focusing distance measuring device is arranged in a space formed in front of the head so that the space is effectively used, to permit down-sizing of the camera.

16 Claims, 7 Drawing Sheets

CAMERA HAVING DEVICE FOR WRITING INFORMATION ONTO FILM

BACKGROUND OF THE INVENTION

1. Field of the Invention

The present invention relates to a camera having a device for writing photographic information onto a film.

2. Description of the Related Arts

There has been disclosed a camera having a device for writing photographic information magnetically onto a film from the backside of an exposure plane or reading film information written on the film previously. In a conventional pre-wind Type camera, when a film is loaded in a cartridge chamber, all unexposed film is wound up from the cartridge chamber to a spool chamber. Thereafter the film is rewound to the cartridge in the order of the exposed frames each time a photographing operation is performed.

On the other hand, in a normal wind type camera, a film loaded in the cartridge chamber is wound onto to a spool chamber in the order of the exposed frames. Thereafter, when all of the film has been exposed and wound onto the spool, the film is rewound into the cartridge again.

Figure 11A:
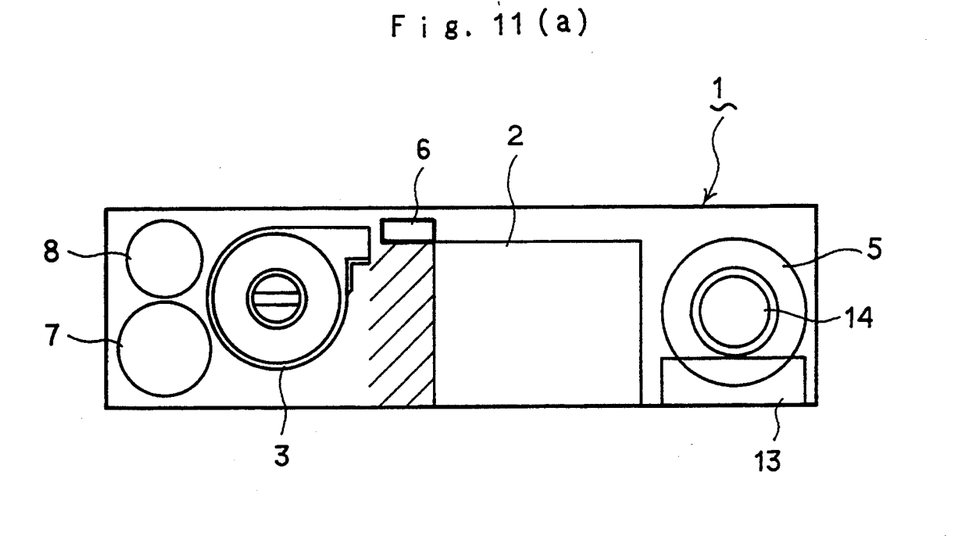
FIG. 11(a) is a top view showing a conventional camera.
Figure 11B:
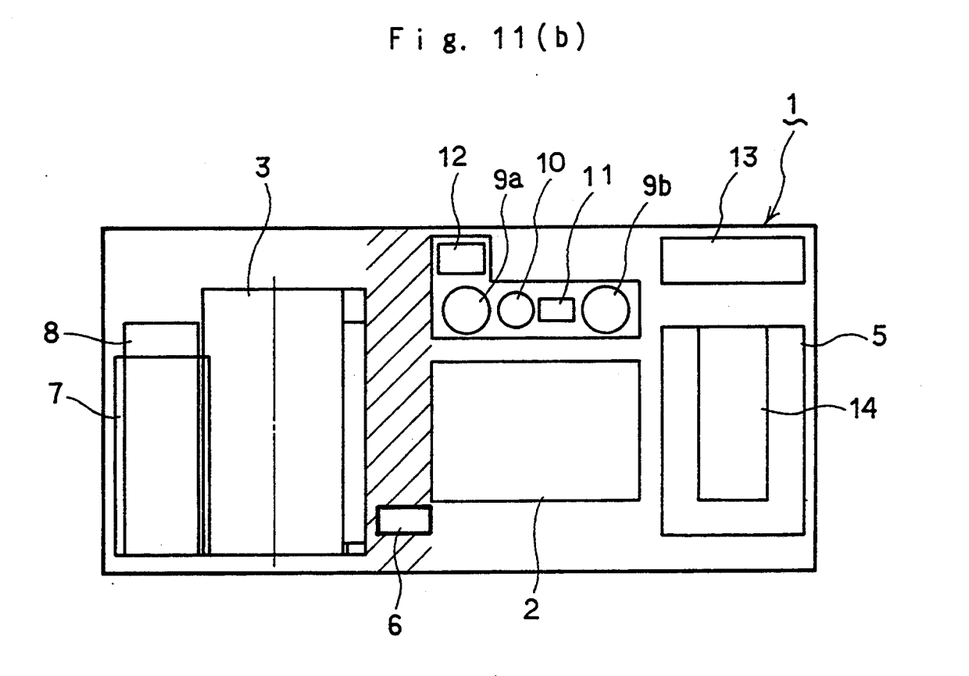
FIG. 11(b) is a front view showing the same.

FIGS. 11 (a) and (b) are front and top view showing a conventional pre-wind type camera. An exposure aperture 2, through which light flux from an object to be photographed is projected onto the film, is provided near a center of a camera body 1, and a cartridge chamber 3 wherein a cartridge of the film is loaded is provided on the left side of the exposure aperture 2, and a spool chamber 5 wherein all unexposed film wound up from the cartridge is provided on the right side of the exposure aperture 2, as shown in the drawing.

Further, a magnetic head 6 for writing or reading information on the film is mounted between the cartridge chamber 3 and the exposure aperture 2 at the lower section in the camera body 1 so as to contact the back surface of the exposed plane of the film. A battery 7 and a capacitor 8 for illuminating a flash are arranged on the opposite side of the cartridge chamber 3 from the exposure aperture 2. On the other hand, an illuminating unit 9a of an auto-focusing distance measuring device, detecting section 10 of a light measuring device, a viewfinder objective lens 11 and a light-receiving unit 9b of the auto-focusing distance measuring device are arranged on the upper side of the exposure aperture 2. A viewfinder eye piece 12 is arranged on the upper backside of the illuminating unit 9a of an auto-focusing distance measuring device. A flash 13 is provided over the spool chamber 5. And a motor 14 for winding the film up is provided inside of a winding shaft of the spool chamber 5.

Figure 12A:
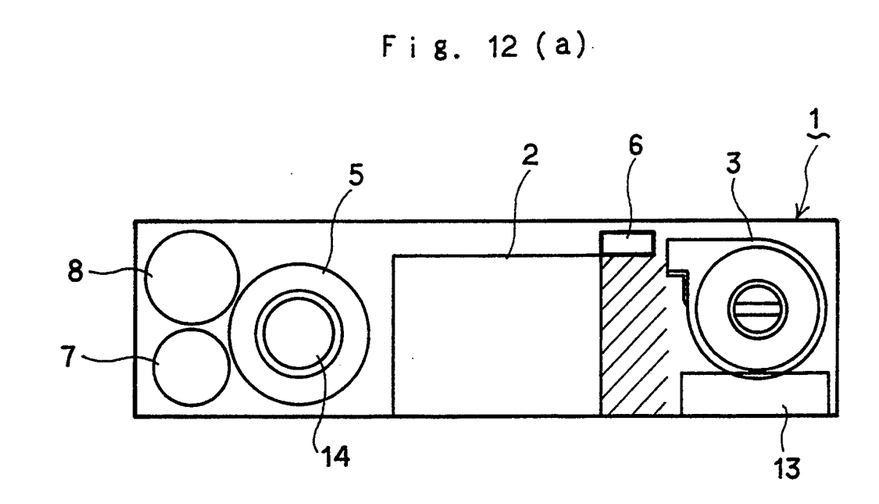
FIG. 12(a) is top view showing a conventional camera.
Figure 12B:
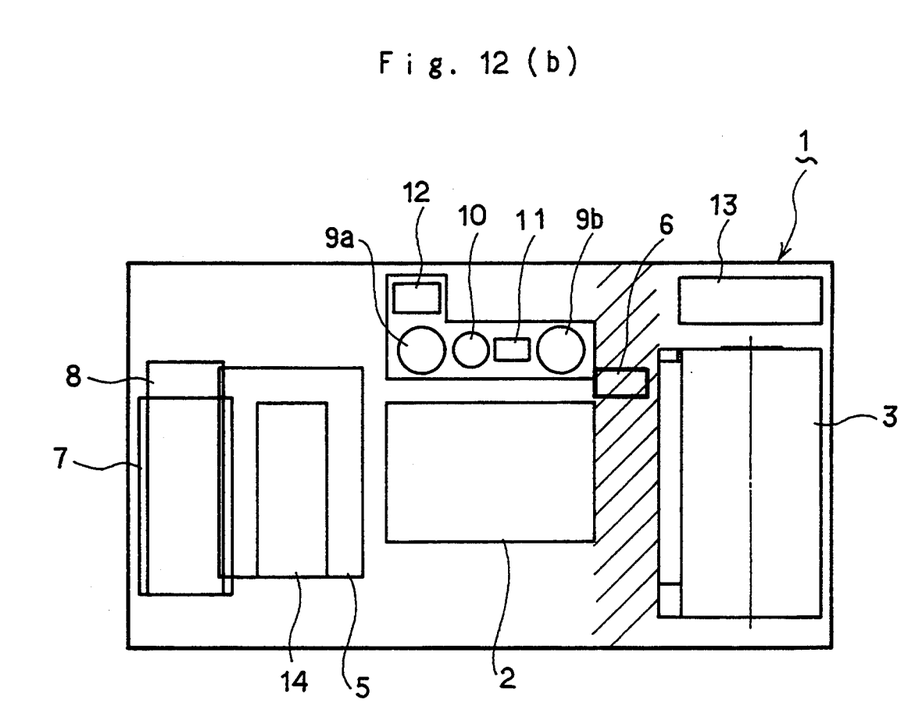
FIG. 12(b) is a front view showing the same.

FIGS. 12 (a) and (b) are top and front views showing the other conventional pre-wind type camera. This camera is different from the above-described camera shown in FIGS. 11 (a) and (b) the following points. A spool chamber 5 is provided on the side of an exposure aperture 2 and a cartridge chamber 3, in which a cartridge is loaded, is provided on the right slide of the exposure aperture 2. A head 6 is mounted between the cartridge chamber 3 and the exposure aperture 2 at the upper section of a camera body 1 so as to contact the back surface of the exposed plane of the film.

In recent years, cameras are becoming smaller in size and such devices as an illuminating unit 9a and a light-receiving unit 9b of an auto-focusing distance measuring device, light detecting section 10, a viewfinder objective lens 11 and a viewfinder eye piece 12 must be arranged in a restricted space of the camera body 1 without wasting space. Besides, in case the other mechanisms are added, it must be designed to use space effectively.

However, in the conventional camera having the magnetic head 6 for writing or reading information on the film as above-described, a space extending above and below the head is formed in front of the film which the head 6 faces from backside thereof, owing to the fact that the head 6 is arranged either between the cartridge chamber 3 and the exposure aperture 2 or between the spool chamber 5 and the exposure aperture 2. This space is shown by the oblique lines in FIGS. 11 (a) (b) and 12 (a) (b). Conventionally, the above space is wasted in vain, and prevents a camera from being small-sized.

SUMMARY OF THE INVENTION

It is an object of the present invention to solve the above-stated problem and to provide a camera having a device such as a magnetic head for writing on a film, in which a space in front of the head can be utilized effectively without waste, whereby a reduction of the camera size can be achieved. It is a further object of the present invention to provide a camera in which the other mechanism or devices besides the information writing and reading device can be easily adaptable in a compact size.

In accomplishing these objects, according to the present invention, there is provided a camera having a frame which delineates an exposure aperture through which optical flux from an object to be photographed is projected onto a film, comprising means for writing information onto a surface of the film, provided beside the frame, and a device for performing the camera operation, provided in front of said writing means and beside said frame along a side face of the frame.

DESCRIPTION OF THE PREFERRED EMBODIMENTS

Figure 1:
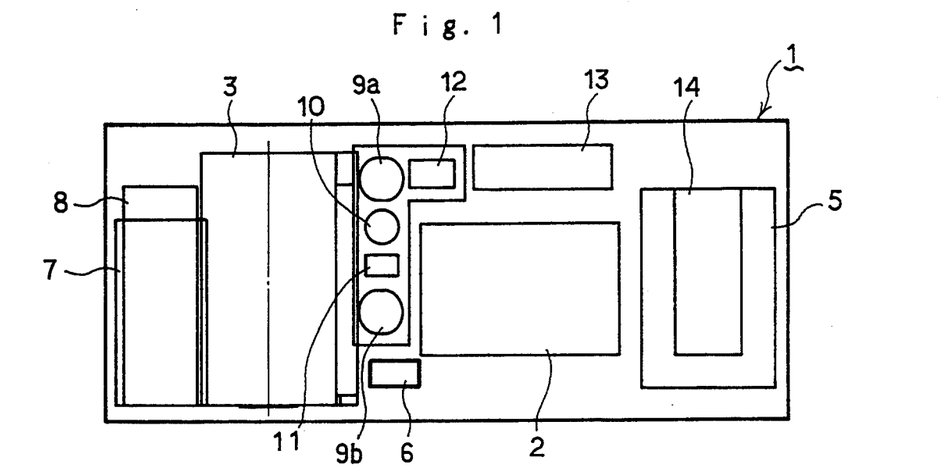
FIG. 1 is a schematic view showing parts arrangement in a camera according to the first embodiment of the present invention.
Figure 2:
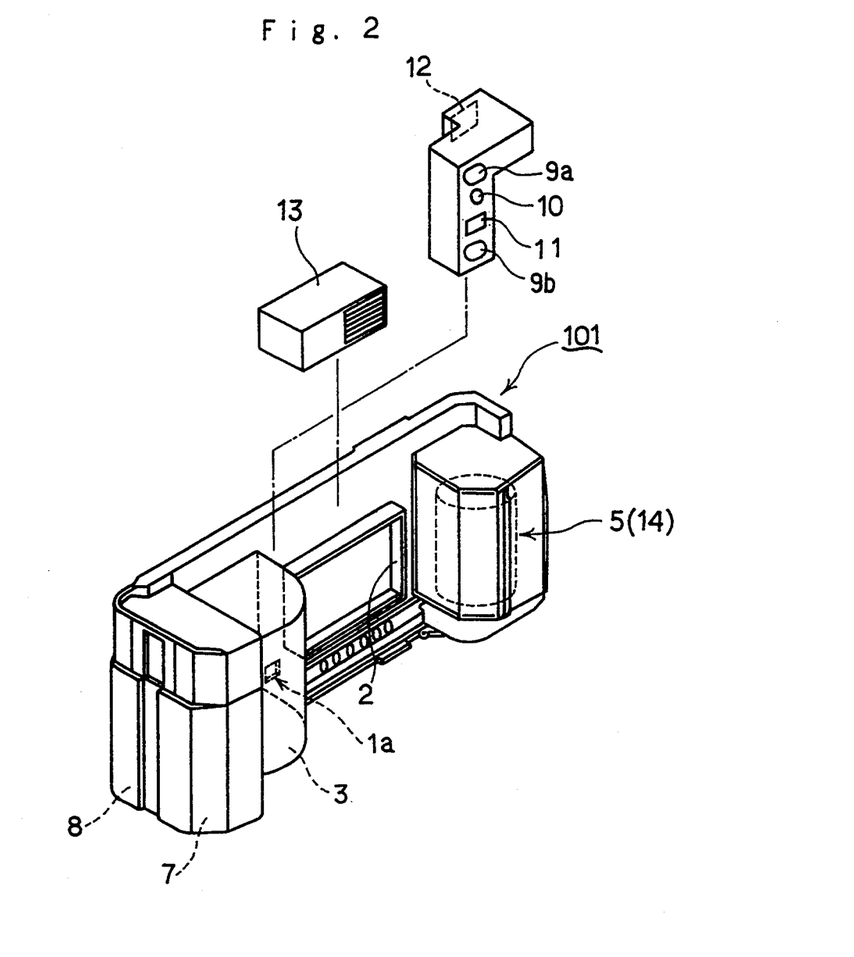
FIG. 2 is a perspective view showing the camera frame of the first embodiment.

Preferred embodiments of the present invention will be particularly described hereinafter with reference to the accompanying drawings. Each following embodiment shows a prewind type camera. FIG. 1 is a schematic structural view of a camera in the first embodiment. FIG. 2 is a perspective view of the camera frame. An exposure aperture 2, through which light flux from an object to be photographed is projected onto a film, is provided near a center of a camera body 1, and an image incident through a photographic lens is exposed as one scene on the film facing the exposure aperture 2. A cartridge chamber 3 for loading a film cartridge is provided on the left side of the exposure aperture 2, and a spool chamber 5 wherein unexposed film is wound up from the cartridge is provided on the right side of the exposure aperture 2, as shown in the drawing.

A magnetic head 6 for writing or reading information is mounted between the cartridge chamber 3 and the exposure aperture 2 at the lower section in the camera body 1, so as to contact a back surface of the film out of an exposure area. The magnetic head 6 is positioned behind the aperture la, while a pad is positioned in front of the aperture la, by which the film is pressed on the head 6. If the pad is formed thinly, it may be designed that the pad is inserted in a forwardly expanded portion formed on the camera frame 101 without the aperture being Formed. Also, if the pad may be formed to be considerably thin, the above aperture 1a and expanded portion are not needed.

A battery 7 and a capacitor 8 for illuminating a flash are arranged on the opposite side of the cartridge chamber 3 from the exposure aperture 2. A flash 13 is provided on the upper side of the exposure aperture 2. And a motor 14 for winding the film up is mounted inside of a winding shaft of the spool chamber 5.

Further, device for performing the camera operations, that is, an illuminating unit 9a of an auto-focusing distance measuring section for auto-focusing (hereinafter referred to as AF), a light detecting section 10 to detect brightness of an object for auto-exposure (hereinafter referred to as AE), a viewfinder objective lens 11 and a light-receiving unit 9b of AF are arranged in order from above, in an upper and lower space (hereinafter referred to as space P, its mark is not shown in the drawings), in front of the film to which the head 6 faces. A viewfinder eye piece 12 is provided on the backside between the illuminating unit 9a of AF and the flash 13.

A viewfinder of the present embodiment is a real image type viewfinder. A real image type viewfinder needs four mirrors or a prism for both reversing right and left sides of the image and inverting the top and bottom of the image so as to change a viewfinder image to an erect image. It is necessary for two reflecting surfaces of these mirrors or prism for reversing right and left or inverting top and bottom to be placed one upon another crossing perpendicularly with each other. In order to arrange these mirrors or prism, a real image type viewfinder requires twice the breadth vertically and horizontally of the optical path of an object image. The space used for a viewfinder arrangement is reduced by using the space P and the upper section of the exposure aperture 2, and reduction of the total camera size can be achieved.

Owing to such arrangements that the illuminating unit 9a and the light-receiving unit 9b and the light detecting section 10 are positioned in the space P wherein nothing has been positioned conventionally, the space P can be used effectively and the vertical length of the camera can be made shorter than the conventional one.

Figure 3:
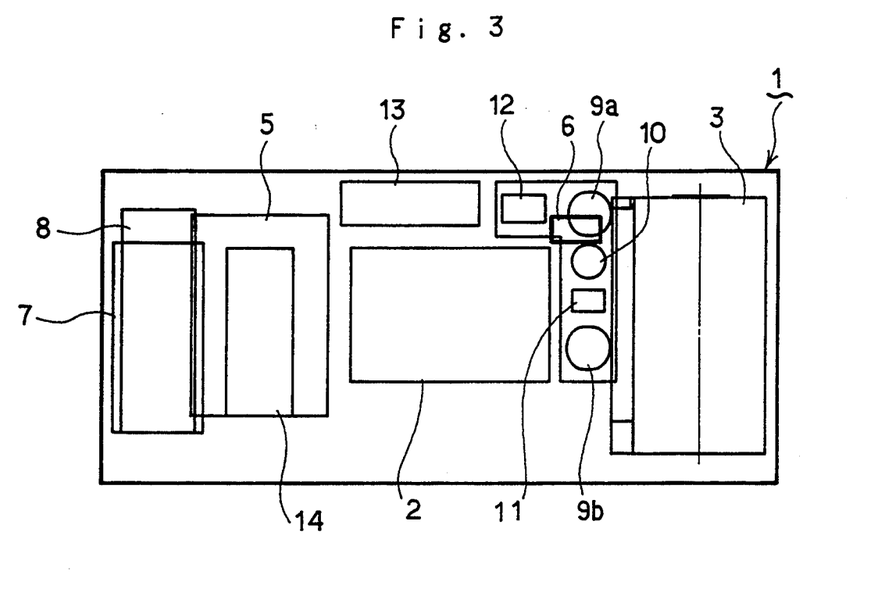
FIG. 3 is a schematic structural view showing a camera according to the second embodiment.
Figure 4:
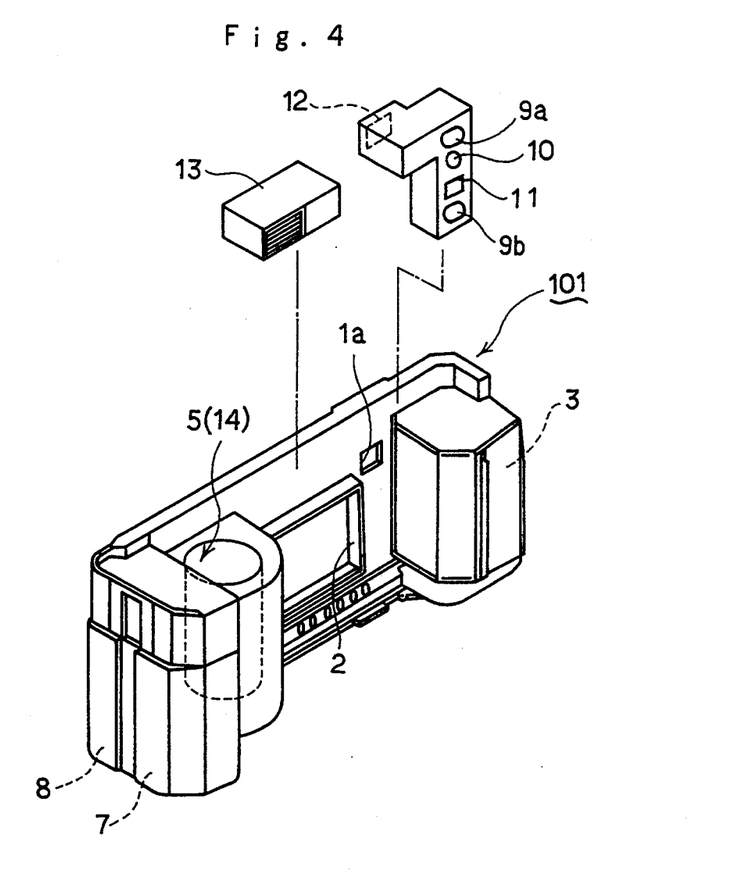
FIG. 4 is a perspective view showing the camera frame of the second embodiment.

Next, the second embodiment will be described with reference to FIGS. 3 and 4. The arrangement of a spool chamber 5 and a cartridge chamber 3, relative to an exposure aperture 2, of the second embodiment reverses that of the first embodiment. A magnetic head 6 is mounted at the upper section of a camera body 1 between the cartridge chamber 3 and the exposure aperture 2.

Further, an illuminating unit 9a, a light detecting section 10, a viewfinder objective lens 11 and a light-receiving unit 9b in order from above, are arranged in a space P similarly to the first embodiment. A viewfinder eye piece 12 and a flash 13 are provided over the exposure aperture 2. Owing To such an arrangement that the illuminating unit 9a, the light-receiving unit 9b and the light detecting section 10 are positioned in the space P, the same effect as the first embodiment can be obtained.

Figure 5:
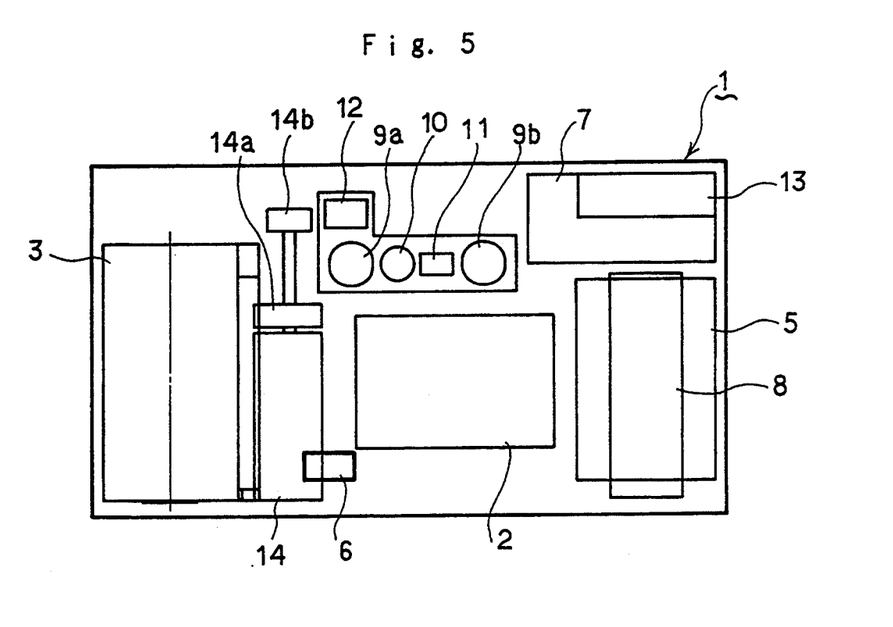
FIG. 5 is a schematic structural view showing a camera according the third embodiment.
Figure 6:
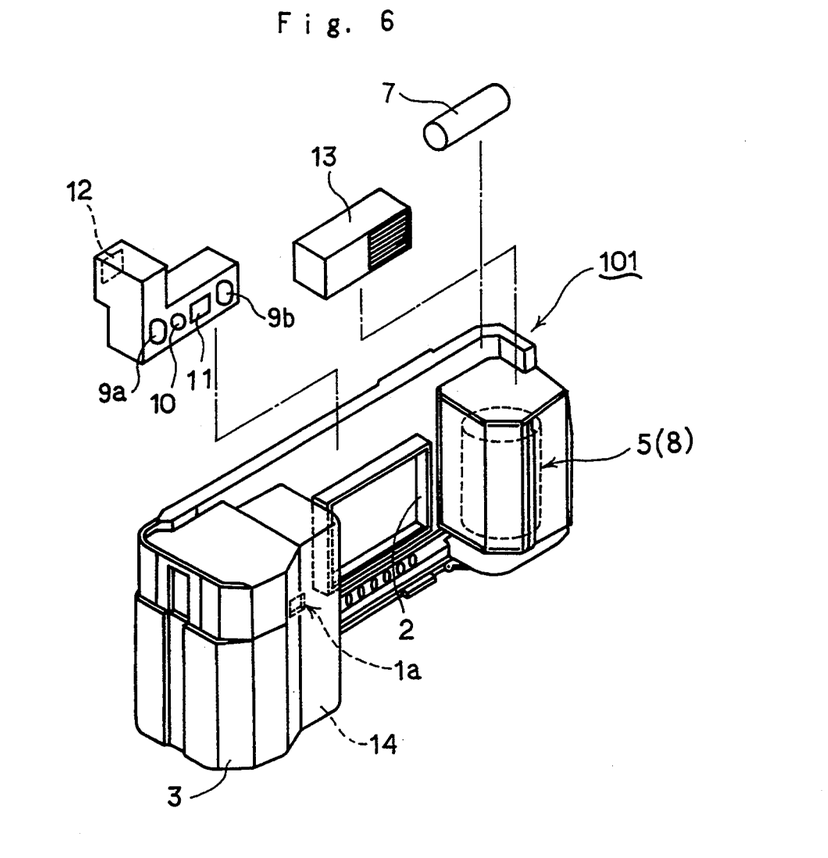
FIG. 6 is a perspective view showing the camera frame of the third embodiment.

Next, the third embodiment will be described with reference to FIGS. 5 and 6. Arrangements of a spool chamber 5 and a cartridge chamber 3, relative to an exposure aperture 2 and the position of a magnetic head 6, are similar to the first embodiment. However, devices arranged in the space P are different from those of the first embodiment. In the third embodiment, a motor 14, a speed-reduction system 14a connected to a shaft of the motor 14 and a driving system 14b connected to a fork for winding the film (not shown) are arranged in the space P.

Besides, in order from the cartridge chamber an illuminating unit 9a, a light detecting section 10, a viewfinder objective lens 11, and a light-receiving unit 9b are provided above the exposure aperture 2. A viewfinder eye piece 12 is provided above the light-receiving unit 9a. A capacitor 8 is mounted in a winding shaft of a spool chamber 5. A battery 7 is provided above the spool chamber 5, and a flash 13 is provided in front of the battery 7.

Instead of the motor 14 and its driving transmitting system arranged in the space P, the capacitor 8 and the battery 7 may be arranged in the space P. In this ease, the motor 14 may be mounted in a winding shaft of the spool chamber 5. Owing to such an arrangement that the motor 14 and its mechanism, or capacitor 8 and the battery 7 are positioned in the space P, the lateral size of the camera can be shortened comparing with a conventional one.

Figure 7:
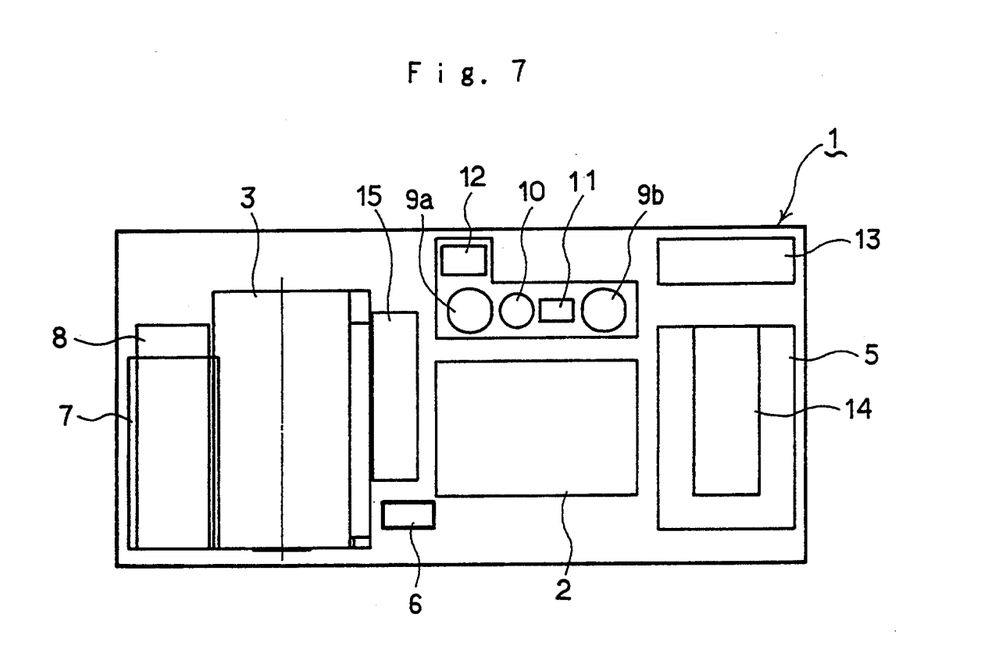
FIG. 7 is a schematic structural view of a camera according to the fourth embodiment.
Figure 8:
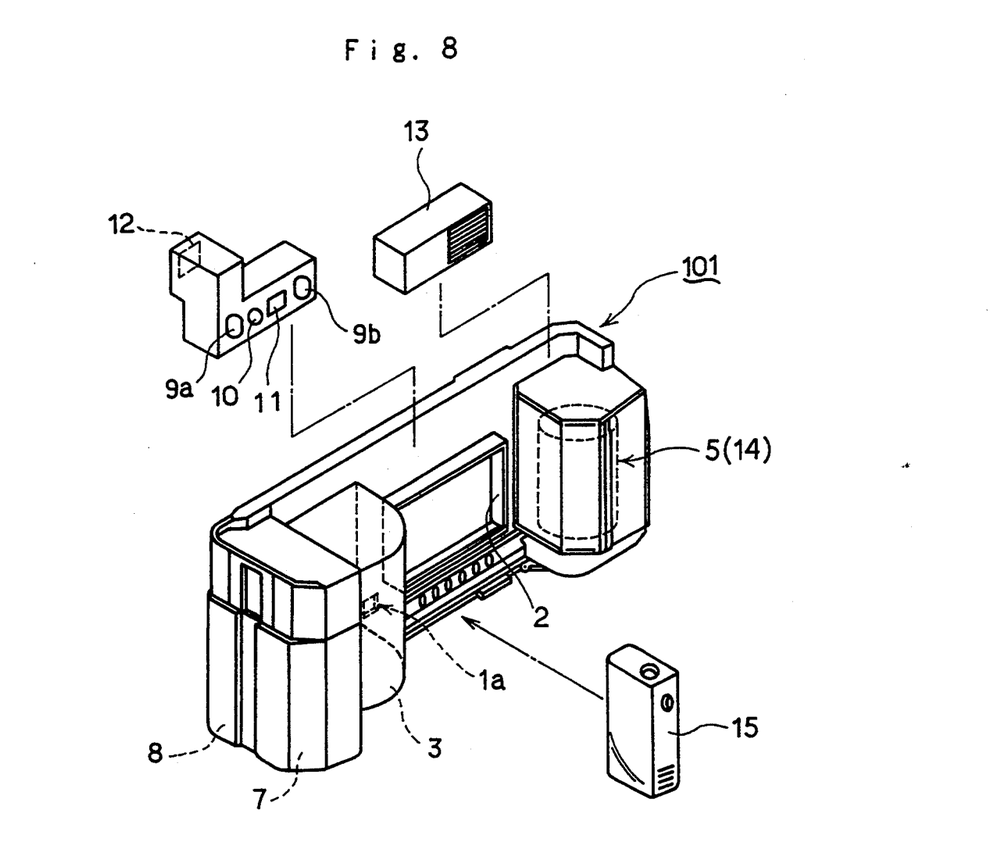
FIG. 8 is a perspective view showing the camera frame of the fourth embodiment.

Next, the fourth embodiment will be described with reference to FIGS. 7 and 8. In the fourth embodiment, an arrangement of a spool chamber 5 and a cartridge chamber 3, relative to an exposure aperture 2 and the position of a magnetic head 6, are similar to the first and third embodiments. However, devices arranged in the space P are different. In the fourth embodiment, a remote control mechanism 15 to release a shutter or the like is arranged in the space P. Arrangements of a battery 7, capacitor 8 and a motor 14 are similar to those of the first embodiment. Positions of an illuminating unit 9a, a light detecting section 10, a viewfinder objective lens 1, a light-receiving unit 9b, a viewfinder eye piece 12 and a flash 13 are similar to those of the third embodiment.

Owing to such arrangement that tile remote control mechanism 15 is positioned in the space P, the space P can be utilized effectively, then other devices can be placed so that the camera has a small size.

Figure 9:
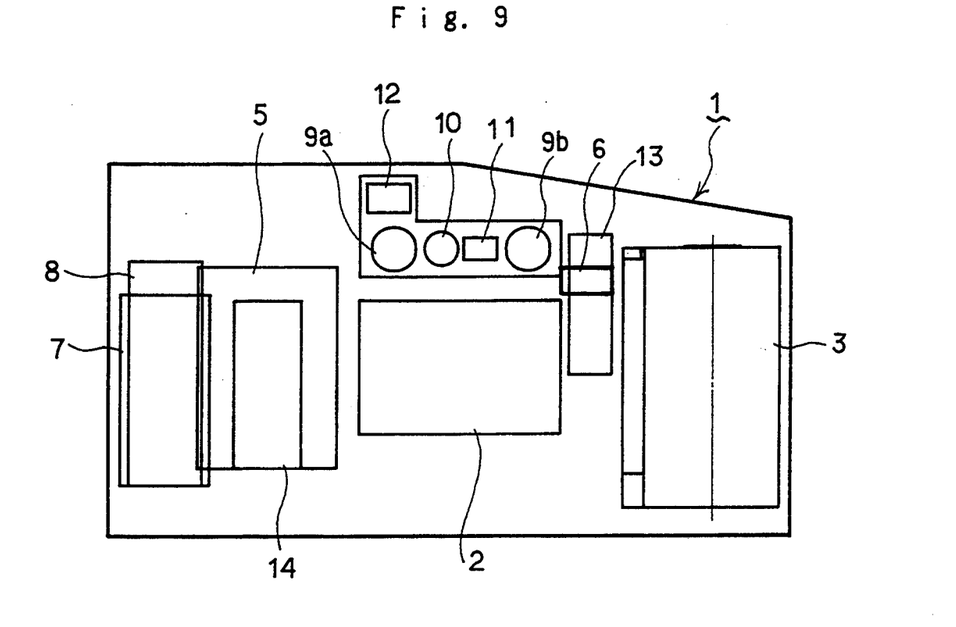
FIG. 9 is a schematic structural view of a camera according to the fifth embodiment.
Figure 10:
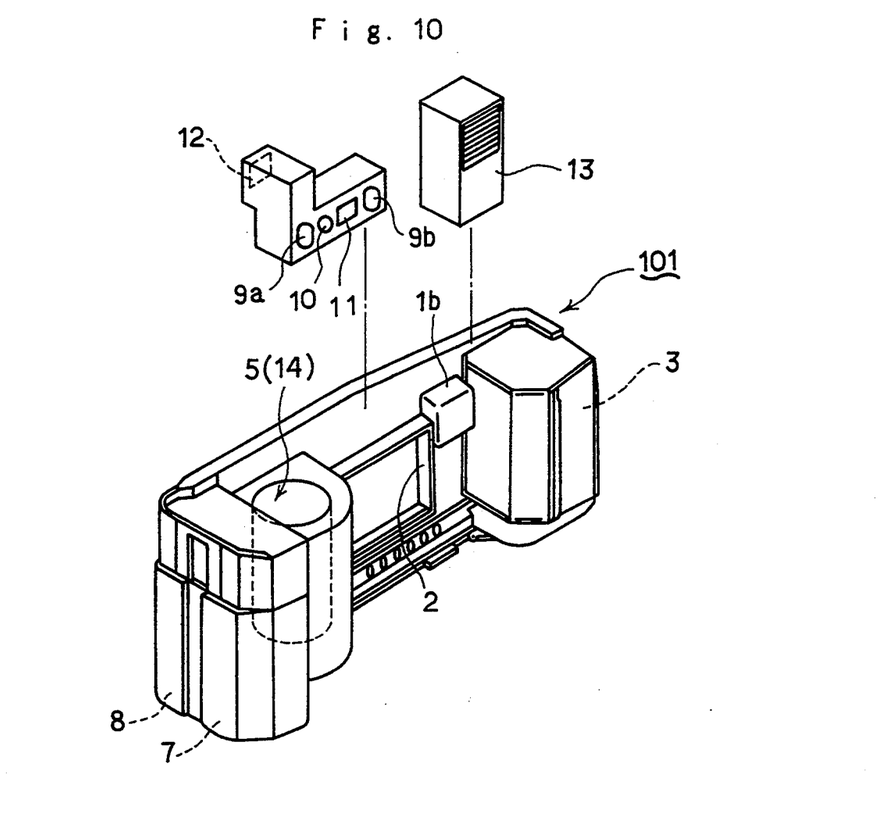
FIG. 10 is a perspective view showing the camera frame of the fifth embodiment.

Next, the fifth embodiment will be described with reference to FIGS. 9 and 10. In the fifth embodiment, arrangements of a spool chamber 5 and a cartridge chamber 3, relative to an exposure aperture 2 and the position of a magnetic head 6, are similar to those of the second embodiment. An exposed portion 1b for accommodating a pad to face the magnetic head 6 is formed on the camera frame 101. Instead of the expanded portion 1b, an aperture 1a as above described may be provided. The devices arranged in a space P are different from those of the second embodiment. That is, a flash 13 is arranged in the space P. Besides, arrangements of a battery 7, a capacitor 8 and a motor 14 are similar to those of the second embodiment. Arrangements of an illuminating unit 9a, a light detecting section 10, a viewfinder objective lens 11, a light-receiving unit 9b and a viewfinder eye piece 12 are similar to those of the third and fourth embodiments.

Owing to such arrangement that the flash 13 is positioned in the space P, a space wherein a flash 13 had been arranged conventionally can be reduced, and the height of the camera lower partly.

According to the present invention mentioned above a head for writing data on a film is arranged on the side of an exposure aperture in a camera frame so as to contact the back surface of the film, and owing to an arrangement of one of a viewfinder mechanism, a light detecting section of a light measuring device and an auto-focusing distance measuring device in the upper and lower space in front of the head, the restricted space in the camera body can be used effectively and scaling down of the camera can be achieved. Further, the other mechanisms can be added to that space.

In addition, embodiments of the present invention are not restricted within the above-mentioned embodiments. But, many variations and modifications are possible. For example, while all of the described embodiments are a pre-wind type camera, it is noted that the present invention can be also applied to a normal wind-type camera similarly to the pre-wind type camera. Furthermore, the present invention can be also applied to a camera wherein a magnetic head 6 for writing and reading information on a film is arranged between a spool chamber 5 and an exposure aperture 2. And, as for a device for writing and reading information on a film, other devices such as a optical writing and reading and the like can be used instead of the magnetic head.

What is claimed is:

1. A camera having a frame which delineates an exposure aperture through which optical flux from an object to be photographed is projected onto a film, comprising:
   means for writing information onto a surface of the film, provided beside the frame; and
   a device for performing a camera operation, provided in a space located directly in front of said writing means, with respect to a plan view of the camera, and beside said frame along a side face of the frame.

2. A camera as claimed in claim 1, wherein said device has an oblong configuration.

3. A camera as claimed in claim 2, wherein said device is a motor.

4. A camera as claimed in claim 2, wherein said device is a holder for receiving a remote controller therein.

5. A camera as claimed in claim 2, wherein said device is a distance measuring unit including a light projecting portion and a light receiving portion.

6. A camera as claimed in claim 1, wherein said writing means includes a magnetic head.

7. A camera having a frame which delineates an exposure aperture through which optical flux from an object to be photographed is projected onto a film, comprising:
   means for writing information onto a surface of the film, provided beside the frame; and
   a device having a window for one of light projection and light reception, provided in a space located directly in front of said writing means with respect to a plan view of the camera, and beside said frame.

8. A camera as claimed in claim 7, wherein said device is a distance measuring device.

9. A camera as claimed in claim 7, wherein said device is a photometry device.

10. A camera as claimed in claim 7, wherein said device is an electronic flash device.

11. A camera as claimed in claim 7, wherein said writing means includes a magnetic head.

12. A camera having a chamber for receiving a roll of film, and a frame which delineates an exposure aperture through which optical flux from an object to be photographed is projected onto a film, comprising:
   means for writing information onto a surface of the film, provided between the frame and the chamber; and
   a device for performing a camera operation, provided in front of said writing means and between the frame and the chamber.

13. A camera as claimed in claim 12, wherein said chamber is a cartridge chamber for loading a film cartridge which accommodates the roll of film.

14. A camera as claimed in claim 12, wherein said chamber is a spool chamber for taking up the film.

15. A camera as claimed in claim 12, wherein said writing means includes a magnetic head.

16. A camera as claimed in claim 12, wherein said device has an oblong configuration.

* * * * *